No. 621,194. Patented Mar. 14, 1899.
O. E. WINGER.
DRIVE CHAIN.
(Application filed Jan. 8, 1898.)
(No Model.) 2 Sheets—Sheet 1.
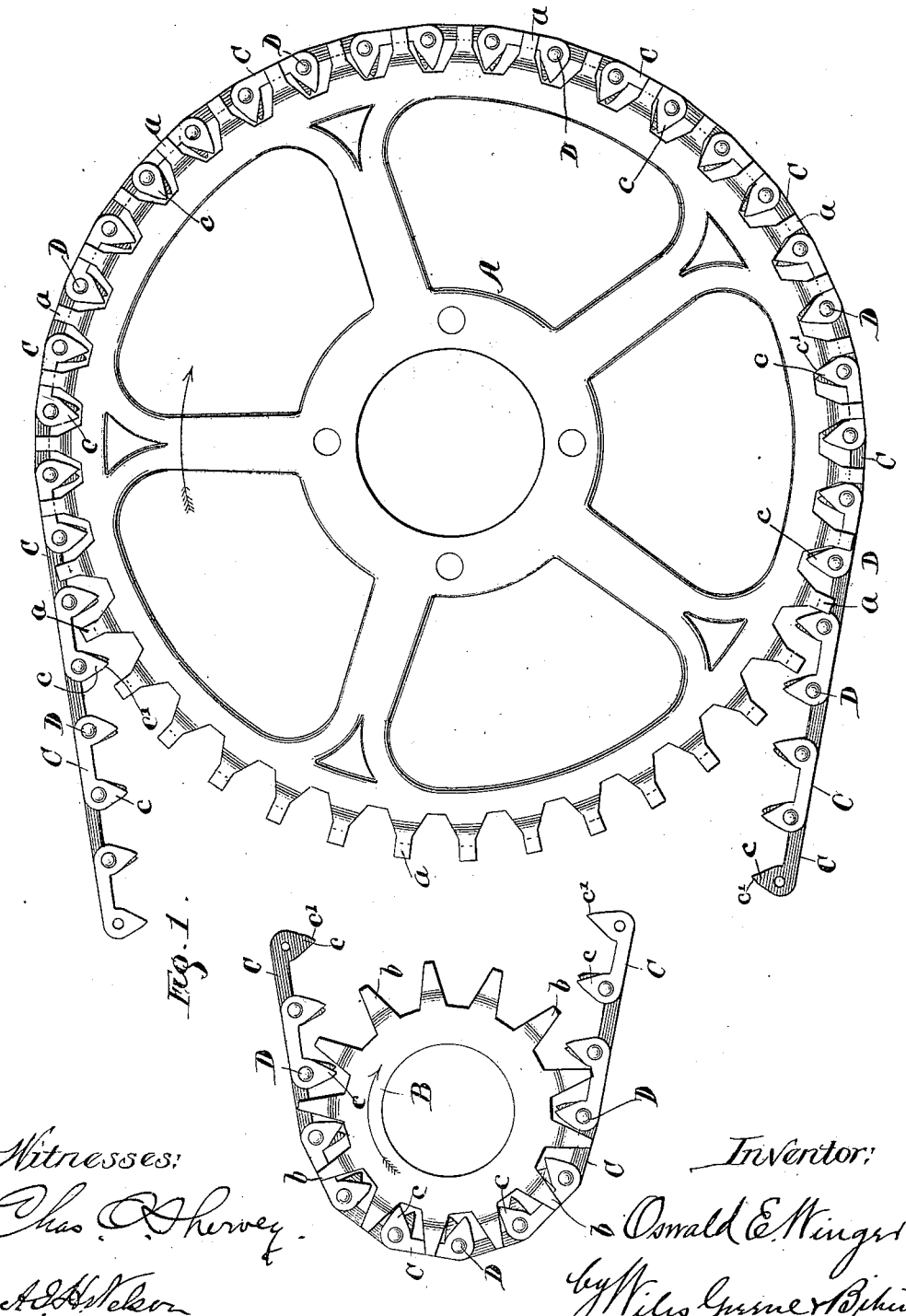

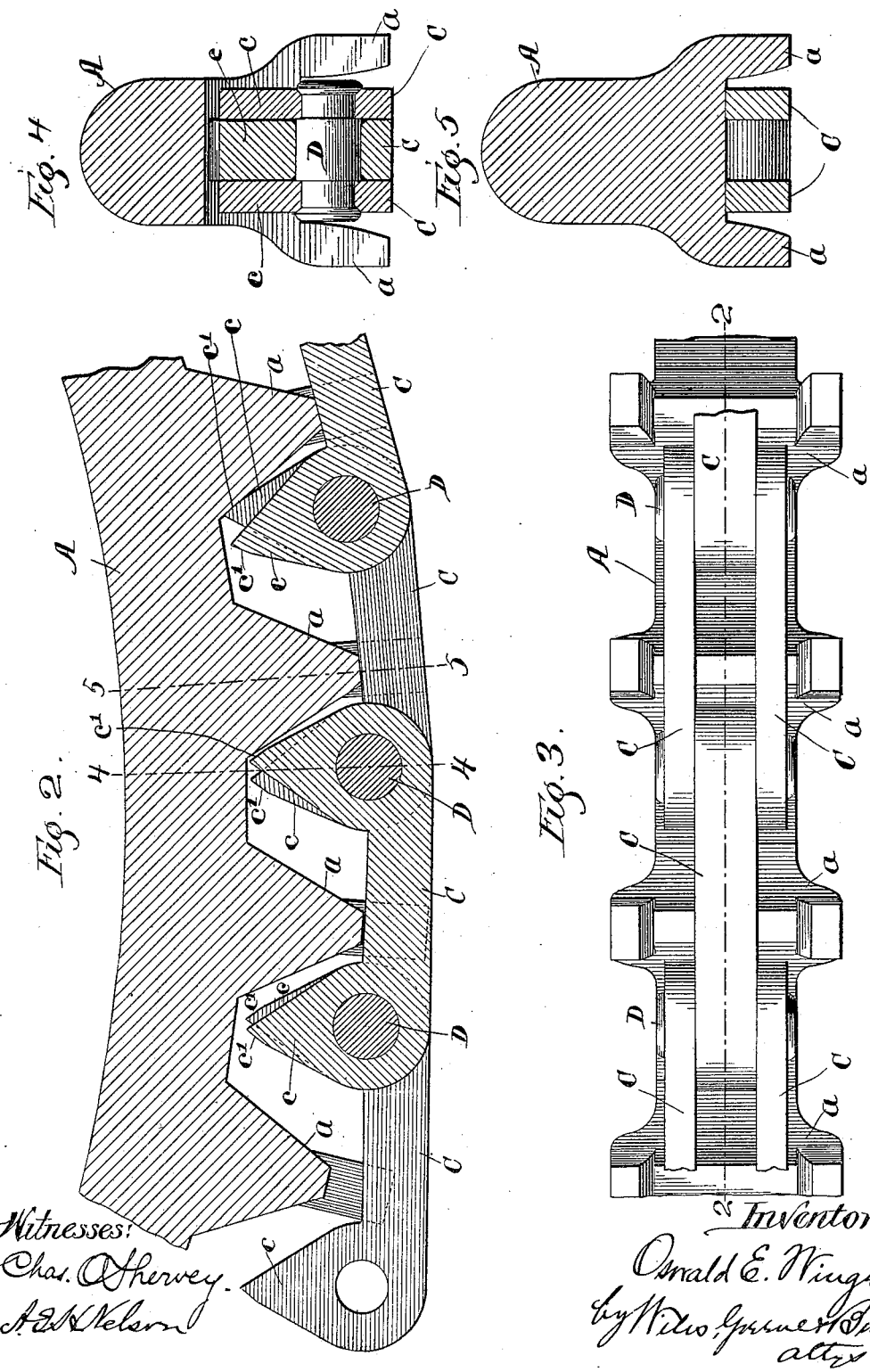

UNITED STATES PATENT OFFICE.

OSWALD E. WINGER, OF CHICAGO, ILLINOIS.

DRIVE-CHAIN.

SPECIFICATION forming part of Letters Patent No. 621,194, dated March 14, 1899.

Application filed January 8, 1898. Serial No. 666,025. (No model.)

*To all whom it may concern:*

Be it known that I, OSWALD E. WINGER, a citizen of the United States of America, residing at Chicago, in the county of Cook and State of Illinois, have invented certain new and useful Improvements in Drive-Chains, of which the following is a specification.

My invention relates to improvements in drive-chains and sprocket-wheels operating in connection therewith, the chain and sprocket-wheel embodying my invention being especially adapted for use on a bicycle, though it is applicable to other machines in which the same peculiarities of structure and operation may be found desirable.

The object of the invention is to secure the advantages hereinafter fully set forth and described, and the invention itself is fully explained in the following specification and shown in the accompanying drawings, in which—

Figure 1 is a side elevation of a pair of sprocket-wheels and a drive-chain running thereon, a portion of the drive-chain between the wheels being broken away. Fig. 2 is a section of a portion of the rim of the larger sprocket-wheel and the corresponding portion of the chain, the plane of section being through the line 2 2, Fig. 3. Fig. 3 is a plan of the portion of the wheel-rim and chain shown in section in Fig. 2. Fig. 4 is a transverse section of the rim and chain through the line 4 4, Fig. 2; and Fig. 5 is a transverse section of the rim and chain through the line 5 5, Fig. 2.

In the preferred form of my invention, illustrated in the drawings, A B are two sprocket-wheels adapted to be connected by my improved chain, the wheel A being formed with an uneven number of outwardly-extending teeth *a a* and the wheel B with an uneven number of substantially similar teeth *b b*, the teeth *a b* being provided at their ends with radial projections adapted to prevent lateral displacement of the parts of the chain in contact with the wheel.

The chain shown in the drawings is made up of alternately single and double links C C, connected by pivots D D at their ends, each of the links being provided at its ends with lugs *c c*, extending inward from the pivot-line of the chain, the parts of the links between said terminal lugs being adapted to rest upon the crowns of the teeth proper of the wheels between the radial projections at the ends thereof, and the inwardly-projecting lugs being adapted to make contact with the faces of the teeth. By reason of the inward projection of the lugs *c c* from the pivot-line of the chain the swinging of each of the links about its pivot as it comes into engagement with the wheel tends to bring the lug into contact with the face of the corresponding tooth of the wheel, and the faces of the teeth and the external faces of the lugs are at such relative angles that only the inner portions of the faces of the lugs come into contact with the faces of the teeth, the result of this construction being that sliding friction of the lugs upon the faces of the teeth is eliminated from the operation of the chain and wheel.

The links of the chain are preferably slightly shorter than the spaces between the teeth, or, in other words, the pitch of the chain is somewhat less than that of each of the wheels, and consequently the chain makes working contact with the face of but one tooth of each wheel at any given time, the location of the tooth in such working engagement being determined by the question whether the wheel is a driving or a driven wheel. As the wheels are shown in Fig. 1, A is the driving-wheel, and B the driven wheel, and the direction of movement of both the wheels is indicated by the arrows thereon. This being the case, the chain is in working contact with the face of a tooth on the lower portion of the larger wheel and also with a tooth upon the lower portion of the smaller wheel. The fact that the chain-links are shorter than the spaces between the teeth necessitates an imperceptible creeping of the chain at the instant of contact of each successive tooth with the corresponding chain-lug, this creeping movement being sufficient to bring the tooth into perfect abutment against the face of the lug on the chain, thereby preventing any sliding friction of these two surfaces, and, as has been observed before, this difference between the pitch of the chain and the pitch of the wheels leaves the faces of all but one of the teeth of each wheel at any given moment free from contact with the chain-lugs. An examination of Fig. 1 will illustrate clearly the fact that as the successive links come into tangency to the upper margin of the larger driving-wheel A they are swung about their pivots, so as to rest upon the crowns of the teeth, ready to be brought successively into engagement with the faces of the teeth through the repeated imperceptible creeping movements of the chain on the wheel, and evidently the successive links of the chain come into contact with the crowns and into engagement with the faces of the teeth of the smaller driven wheel B at its lower margin. Furthermore, the contact of the successive links of the chain with the larger wheel is evidently broken at the lower margin, whereas the links successively leave the smaller wheel at its upper margin, and on both wheels the form of the teeth and the relative form of the lugs on the chain are such that the lugs leave their engagement with the faces of the teeth without sliding friction.

It will be observed that since the links of the chain are alternately single and double the alternate teeth of the wheel receive pressure from single and double lugs of the chain. In order to prevent uneven wear of the working face of each of the teeth, it is desirable to make each wheel with an uneven number of teeth, as shown, in order that in the successive rotations of each wheel each tooth may make contact alternately with single and double lugs. This feature of construction is evidently only valuable when a chain whose alternately single and double links have end faces projecting inward from the pivot-line is combined with a wheel all of whose teeth are adapted to receive the contact-pressure of either single or double end faces. While a wheel with an odd number of teeth has the advantage thus set forth, all the other advantages of my construction are as fully secured by the use of wheels each of which has an even number of teeth, and I desire, therefore, not to limit the invention in this respect, except in the claim, which contains this specific definition.

As shown in the drawings, each of the links of the chain is formed with terminal inwardly-projecting lugs separated by a notch or space, and this is the form adapted for use with wheels having teeth of the specific construction illustrated in the drawings and is the form which I consider the preferred embodiment of my invention in this respect. It is evident, however, that the notch or recess in the inner face of each link is not essential, the inwardly-projecting end faces which engage the faces of the teeth being equally effective whether the inner faces of the links be notched or straight. I intend, therefore, not to limit the invention in this respect to the specific form shown, except in the claim, which contains such limitation. The links of the chain, as shown, are alternately single and double; but they may be alternately double and triple or may be made up of any desired plurality of parallel bars having the same variation of number from link to link.

Having now described and explained my invention, what I claim as new, and desire to secure by Letters Patent, is—

The combination with a sprocket-wheel having a series of outwardly-extending teeth, of a drive-chain made up of a series of links pivoted together and having end faces extending inward from the pivot-line of the chain, the pitch of the chain being slightly less than the pitch of the wheel and the inner portions only of the end faces of the links being adapted to engage the faces of said teeth.

In witness whereof I have hereunto set my hand, at Chicago, in the county of Cook and State of Illinois, this 1st day of November, A. D. 1897.

OSWALD E. WINGER.

Witnesses:
CHAS. O. SHERVEY,
A. I. H. NELSON.